Dec. 8, 1925.
M. B. LLOYD
VEHICLE HOOD FIXTURE
Filed Nov. 4, 1921
1,564,969
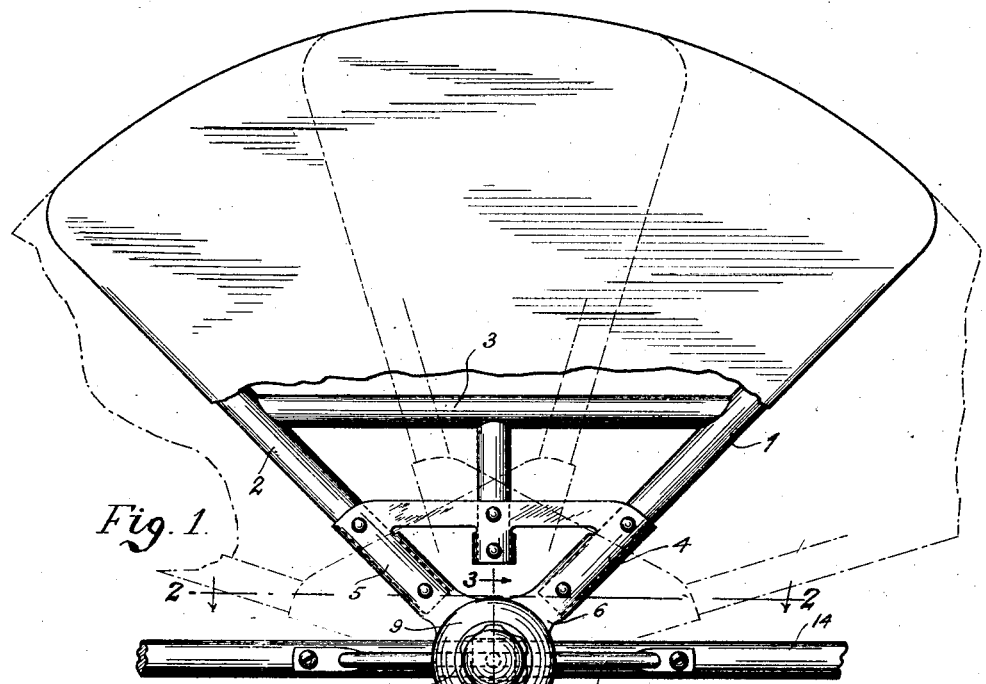
Fig. 1.
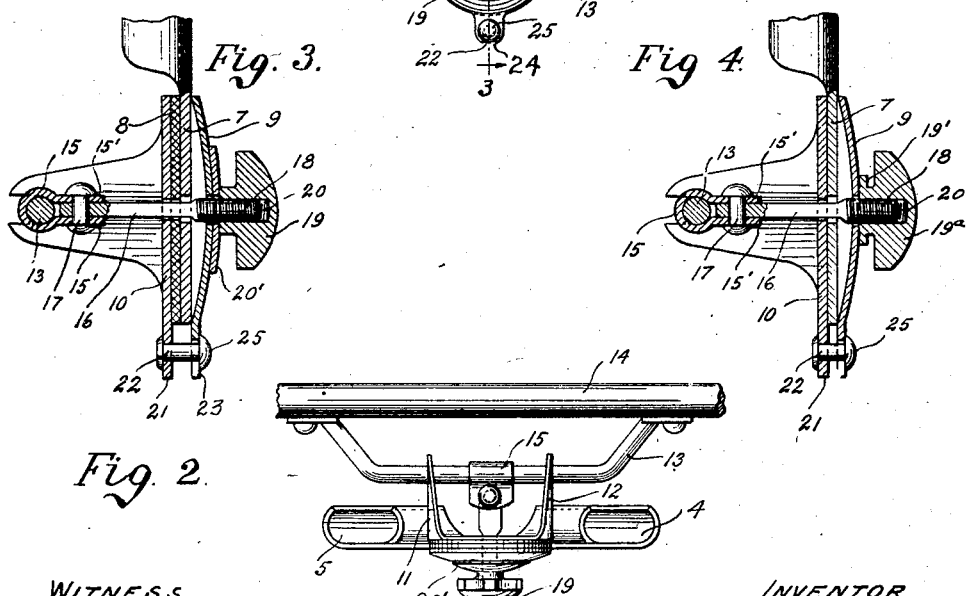
Fig. 3.    Fig. 4.
Fig. 2.
WITNESS
O.E. Johnson
INVENTOR
Marshall B. Lloyd
BY
ATTORNEY Patented Dec. 8, 1925.

1,564,969

UNITED STATES PATENT OFFICE.

MARSHALL B. LLOYD, OF MENOMINEE, MICHIGAN, ASSIGNOR TO HEYWOOD-WAKEFIELD COMPANY, OF BOSTON, MASSACHUSETTS, A CORPORATION OF MASSACHUSETTS.

VEHICLE-HOOD FIXTURE.

Application filed November 4, 1921. Serial No. 512,760.

*To all whom it may concern:*

Be it known that I, MARSHALL B. LLOYD, a citizen of the United States, and a resident of Menominee, county of Menominee, and State of Michigan, have invented certain new and useful Improvements in Vehicle-Hood Fixtures, of which the following is a specification.

My invention relates generally to improvements in fixtures for children's vehicles, bassinets and the like, but has more particular reference to improvements in fixtures for attaching or securing hoods, canopies and the like to the body parts of said devices.

Canopies, hoods and the like are provided as a part of bassinets, baby carriages, go-carts, and similar children's vehicles for the purpose of protecting the child from the sun, wind and other elements. Particularly with respect to a young infant it is necessary to take especial care to protect the child against the elements and this necessitates the frequent adjusting or positioning of the hood or canopy in the manner best adapted to the varying climatic conditions. It has, therefore, been the common practice pivotally to mount the hood or canopy upon the body of the carriage, and to provide a thumb screw or wing nut to be tightened when the hood or canopy has been placed in the desired position. This construction, although universally used, is open to objection upon a number of grounds. For instance, in order to swing the hood, it is necessary to loosen the two thumb screws or wing nuts upon opposite sides before the hood can be swung, and then to tighten them after the hood has been properly positioned. Because of the time required to make this adjustment the attendant is likely not to reposition the hood as frequently as desirable to meet the varying conditions of sun, wind and other elements. Not only is this adjustment one requiring some time and effort, but when the thumb screws are tightened the vibration of the carriage hood, in use, frequently loosens these nuts and permits the hood to swing down with considerable force. Particularly is this true with the relatively large and heavy hoods or canopies found in the larger children's vehicles, where the hood is composed of wooden frame parts covered throughout with solid woven fabric, such as reed, and heavily upholstered with corduroy and other trimmings. When such a hood accidentally becomes loose and drops down it usually strikes other parts of the carriage and damage to the hood and carriage results. If the hood swings toward the pushers it may engage them with great force and since they are usually composed of metal, considerable damage is caused to the hood. And yet these hood fixtures with the wing nut have been considered necessary because for shipping purposes it is necessary to remove the hood entirely from the body of the carriage and this has been thought to necessitate such a construction.

The general object of my invention is to provide a hood fixture construction in which the hood can be merely grasped and swung to desired position where it will be securely held against displacement.

Again it is an object of my invention to provide a hood fixture construction which may be moved back and forth as frequently as desired without danger of loosening the securing means.

It is also an object of my invention to provide a hood fixture construction which permits of the hood being readily removed for shipping purposes and quickly and easily attached by any one, without the necessity of tools of any kind.

I aim also to provide a hood fixture construction which shall be composed of relatively few parts that are of simple form and of durable construction.

My invention consists generally in the form, arrangement, combination and coaction of the parts whereby the above named objects, together with others that will appear hereinafter, are attainable; and my invention will be more readily understood by reference to the accompanying drawings, which illustrate what I consider, at the present time, to be the preferred embodiment thereof.

In said drawings:

Fig. 1 is a side elevation of a hood equipped with hood fixtures embodying my invention.

Fig. 2 is a detail view thereof substantially on the line 2—2 of Fig. 1.

Fig. 3 is a vertical sectional view substantially on the line 3—3 of Fig. 1; and Fig. 4 is a detail sectional view similar to Fig. 3, but illustrating a modified form of my invention.

I shall describe my invention in connection with a hood frame, such as is extensively used for baby carriages made of woven reed, fibre reed, and the like, but this, it should be understood, is by way of illustration, and not by way of limitation.

Referring now first to Figs. 1 to 3, inclusive, the hood as here shown is composed of dowel like U-shaped frame members 1 and 2 which are cross-connected by a member 3. The lower ends of the members 1 and 2 enter socket portions 4 and 5, respectively, of the hood fixture member 6. The hood fixture member 6 terminates in a lower circular plate-like portion 7 which, as is probably best shown in Fig. 3, is interposed between a flat disk 8 and a cambered disk 9. The flat disk 8, in turn, abuts against a flat part of the metal fixture member 10. The member 10 is provided with two inwardly extending arm portions 11 and 12 respectively which are provided with slots at their ends and which straddle a rod or bracket 13 that is rigidly secured to the frame 14 representing the body portion of the baby carriage, bassinet or other device, upon which the hood or canopy is to be mounted. It is desirable to mount the hood so that it can be swung around a pivot and also so that it can be shifted bodily along the bracket 13; this for the purpose of positioning it better to cooperate with the particular carriage or other device on which it is mounted. It should here be stated, that there is another set of fixture parts upon the opposite side of the hood, but inasmuch as the construction and operation thereof is like that here shown, the description of one will suffice for both.

Thus, I mount on the rod or bracket 13 a clip or folded metal member 15 which is just large enough to accommodate the rod or bracket 13 slidably therein. It is provided with two spaced extensions 15′ between which is positioned a stud member 16. The stud member 16 is pivotally joined to the member 15 by means of the pivot 17 and the outer end thereof is enlarged and shaped to circular form and provided with screw threads 18. A thumb nut 19 is provided, having therein suitable screw threads 20 to co-act with the screw threads 18. Thus by rotating the nut 19 in one direction it is moved axially of the stud 16 and toward the rod 13 of the carriage, thus tending to move the various elements of the hood fixture toward the rod, but such action is prevented because the end portions 11 and 12 of the member 10 prevent movement of that member and hence the result is that parts are merely tightened. Because of the cambered shape of the member 9, considerable pressure can be applied to the parts and, better to distribute this pressure, I have provided a smaller cambered disk 20′, which is interposed between the disk 9 and the nut 19. The disk 8 is preferably one which will offer considerable friction such for example as a fibre disk. Thus by tightening the nut sufficient friction can be created to hold the parts in place and yet when the hood is grasped by the attendant it can be easily swung to any desired position. Several positions are shown in Fig. 1, one thereof by means of the solid lines and the others by means of the dot and dash lines. This swinging movement of the hood, however, would loosen the nut 19 and permit the hood to fall, unless special provision is made, and I have, therefore, provided a novel construction for overcoming this difficulty. To this end, I have provided an extension 21 at the lower end of the fixture member 10 in which I have rigidly secured an outstanding rivet or stud 22. The lower part of the cambered disk 9 is provided with an extension 23 which has a slot or recess 24 therein that straddles the rivet or stud 22. The outer end of the stud 22 is provided with a large head 25 to prevent displacement of the cambered disk 9. This construction permits a ready assembling and disassembling of the parts and yet positively prevents loosening of the nut 19 when it has been turned to secure the desired pressure. The hood may be swung back and forth as many times as desired and it will be found that it will always stay where placed. The reason for this, I am convinced, is that since the part that engages the nut 19 is held stationary, there is nothing to cause it to move, and therefore it naturally remains in any placed position.

By loosening the nut 19, sufficient slack is placed in the parts to permit the member 15 to be moved along the bracket 13 to any desired position and when the nut 19 is again tightened the parts will be held against movement on the bracket.

I have thus provided a construction in which the hood can be swung to any desired position, in which position it will remain until a different position is desired; a construction in which it is unnecessary for the attendant to loosen any parts to make the adjustment; and a construction which, at the same time, permits the ready demounting from and remounting of the hood upon the body of the baby carriage or other device with which it is associated. This latter feature, therefore, enables a convenient nesting or arrangement of the body and hood as is necessary for shipping purposes. There are many other advantageous features which will occur to those skilled in this art by virtue of this disclosure.

Fig. 4 is a modification of my invention wherein I have omitted certain of the parts shown in Figs. 1 to 3, to wit, the cambered washer 20' and the separate friction disk 8. Since the other parts are alike in construction and operation I have given them the same reference characters. Since the cambered washer 20' has been omitted I prefer to provide a nut 19ª with an enlarged base portion 19' better to distribute the pressure to the cambered disk 9. The construction shown in Fig. 4 is simpler than that shown in the other views and can, therefore, be produced at lower cost and while the same amount of friction cannot as readily be secured, it may be used to advantage particularly with the smaller and lighter hoods and canopies.

I do not wish to be limited to the construction or constructions herein shown and described except only as may be necessary by limitations in the hereunto appended claim.

I claim:

A device of the kind described embodying therein a supporting rod, a body fixture including a flat face portion having oppositely disposed bifurcated arms adapted to straddle said rod and an extension, a hood fixture element also having a flat face portion coacting with the similar portion on the body fixture element, a concavo-convex tension member engaging at its edges with said hood fixture element and having an extension in line with the extension on said body fixture element, one of said extensions having a notch therein, a member fixed in the other extension and extending into the notch in the first extension to hold the tension member against rotation, a bolt operatively engaged with the rod and extending through said elements and tension member and a nut threaded on said bolt for adjusting the tension of said tension member.

In testimony whereof, I have hereunto set my hand, this 29th day of October, 1921.

MARSHALL B. LLOYD